UNITED STATES PATENT OFFICE.

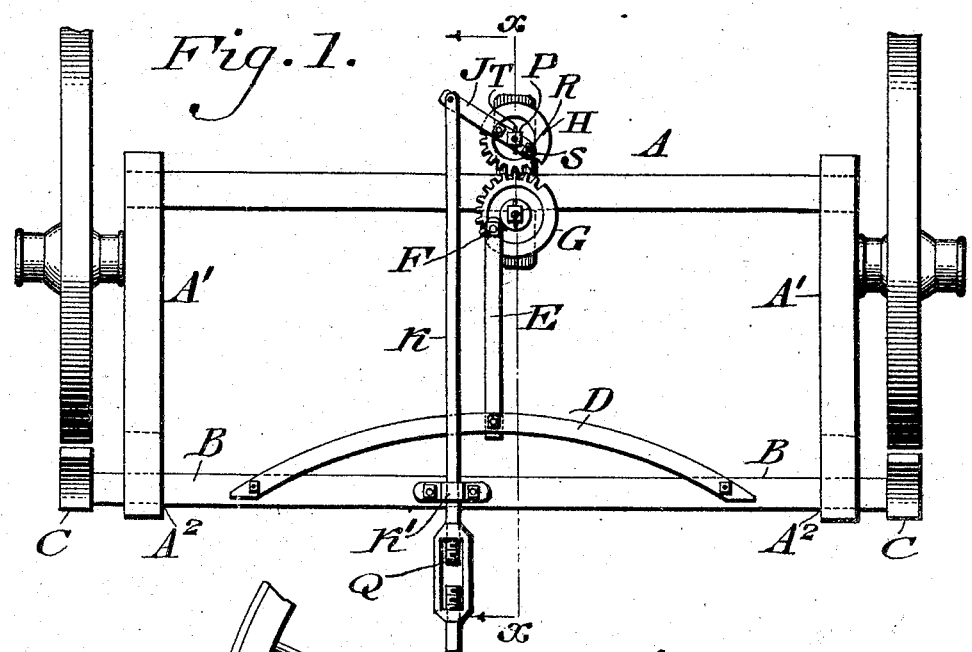

WILLIAM GIBSON, OF PHILADELPHIA, PENNSYLVANIA.

BRAKE FOR WAGONS AND OTHER VEHICLES.

No. 806,536.   Specification of Letters Patent.   Patented Dec. 5, 1905.

Application filed July 7, 1905. Serial No. 268,706.

*To all whom it may concern:*

Be it known that I, WILLIAM GIBSON, a citizen of the United States, residing in the city and county of Philadelphia, State of Pennsylvania, have invented a new and useful Improvement in Brakes for Wagons and Other Vehicles, of which the following is a specification.

My invention consists of a brake for a wagon or other vehicle, which is constructed of gearing interposed between the draft-bar and brake-beam in such manner as to cause the brake to be effectively operated in a comparatively easy but powerful manner, and there is a simplicity of construction and compactness of parts, as will be hereinafter set forth.

Figure 1 represents a top or plan view of a brake embodying my invention. Fig. 2 represents a longitudinal vertical section on line $x$ $x$, Fig. 1. Fig. 3 represents a top or plan view of a brake, showing a duplication of certain mechanism employed in the other figures.

Similar letters of reference indicate corresponding parts in the figures.

Referring to the drawings, A designates a portion of the running-gear of a wagon or other vehicle.

B designates the brake-beam, which is guided on the sills A', as at A², and to which the shoes or blocks C are attached. Pivotally connected with said bar by the piece D is the slidable rod or link E, the latter being also connected with the eccentrically-arranged wrist-pin F on the pinion G.

H designates a pinion which meshes with the pinion G, said pinions G and H being mounted on suitable members of the running-gear and occupying the same plane and in the present case being mutilated. Said pinions G and H occupy the same plane, thus providing for a simplicity of construction and compactness of corresponding parts of the brake.

J designates an arm which is bolted or otherwise firmly connected with the pinion H and extends radially therefrom, its outer end having connected with it the slidable draw-bar K, the latter being fitted in the guide K' on the beam B and adapted to be operated from the driver's seat or any other convenient part of the wagon or vehicle.

The operation is as follows: The bar K is drawn in the direction of the arrow, whereby the pinion H is rotated. This imparts rotation to the pinion G, whereby as the link E is eccentrically connected with said pinion G the brake-bar B is pulled and the shoes or blocks C are firmly pressed against the wheels, it being evident that the brake is put on in a comparatively easy but powerful manner. When said bar is moved in the reverse direction, the mechanism is operated, whereby the brake is thrown off.

In Fig. 3 I show a duplication of gearing H, G, and J, the latter being pivotally attached to the links L, which have a common connection, as at M, with the draft-bar K, thus doubly operating the brake-beam B.

In order to adjust the gearing to the required throw of the bar K and of the brake-shoes, the pinion H is mounted on the bolt N and carries a tightening-nut P, which when removed permits said pinion to be displaced, whereby it may be turned and then engaged with other teeth of the pinion G. This affects the position of the arm J with regard to its connection with the bar K; but the latter may also require to be adjusted in length, for which purpose it is divided and the members are connected by the rotatable turnbuckle Q, the effect of which is evident.

Owing to the strain on the arm J, it requires to be firmly connected with the pinion H. For this purpose I employ a plurality of bolts R, which are passed through said wheel on opposite sides of the center or axis of the same, and the inner end portion of the arm has a plurality of openings to receive said bolts, the latter being provided with nuts S, which when tightened hold the arm firmly in position, this being assisted by fitting the arm on the upper end of the bolt N and holding it in position by the nut P aforesaid, thus increasing the rigid connection of the arm with the pinion.

The nut P has a pin T passed therethrough, the same entering the bolt N and serving as a fastener or lock for said nut.

Having thus described my invention, what I claim as new, and desire to secure by Letters Patent, is—

1. In a brake, a brake-beam, wheels adapted to gear with each other, a slidable draft-bar, means for connecting said bar with one of said wheels for operating the same, and a slidable link which is eccentrically mounted on the other wheel and connected with said beam.

2. In a brake, a brake-beam, a draft-bar, wheels gearing with each other, an arm on one of said wheels and a rod eccentrically connected with the other wheel, said draft-bar being pivotally attached to said arm, and said brake-beam being pivotally attached to said rod.

3. In a brake, a brake-beam, a draft-bar, wheels gearing with each other, a radial arm on one of said wheels the same being connected with said draft-bar, a link eccentrically connected with the other wheel and a connection for said link and brake-beam.

4. In a brake, a brake-beam, a draft-bar, wheels gearing with each other, an arm on one of said wheels, a link eccentrically connected with the other wheel, a connection for said link and brake-beam and means on said brake-beam for guiding said draft-bar.

5. In a brake, a brake-beam, a draft-bar, a gear-wheel, an arm extending radially from the latter and connected with said draft-bar, another gear-wheel meshing with the first named, a link extending eccentrically from the second-named gear-wheel and connected with said brake-beam and an auxiliary bolt for securing said arm, which latter is mounted on the axial bolt of the first-named gear-wheel and said bolt passing through said wheel between the center and periphery.

WILLIAM GIBSON.

Witnesses:
JOHN A. WIEDERSHEIM,
S. R. CARR.